United States Patent
Pritchard

(10) Patent No.: US 10,690,170 B2
(45) Date of Patent: *Jun. 23, 2020

(54) FASTENER SYSTEM COMPRISING AN EXTERNALLY THREADED BOLT AND AN INTERNALLY THREADED NUT FOR THE AVOIDANCE OF CROSS-THREADING OF THE MATING THREADS DURING ASSEMBLY

(71) Applicant: Research Engineering & Manufacturing, Inc., Middletown, RI (US)

(72) Inventor: Alan Pritchard, Cornwall (GB)

(73) Assignee: Research Engineering & Manufacturing, Inc., Middletown, RI (US)

( * ) Notice: Subject to any disclaimer, the term of this patent is extended or adjusted under 35 U.S.C. 154(b) by 204 days.

This patent is subject to a terminal disclaimer.

(21) Appl. No.: 15/808,276

(22) Filed: Nov. 9, 2017

(65) Prior Publication Data
US 2018/0066695 A1    Mar. 8, 2018

Related U.S. Application Data

(63) Continuation of application No. 14/674,837, filed on Mar. 31, 2015, now Pat. No. 9,835,193.

(60) Provisional application No. 61/987,138, filed on May 1, 2014.

(51) Int. Cl.
F16B 33/02    (2006.01)
F16B 35/04    (2006.01)

(52) U.S. Cl.
CPC ............ *F16B 33/02* (2013.01); *F16B 35/047* (2013.01)

(58) Field of Classification Search
CPC ...... F16B 35/0047; F16B 33/02; F16B 35/047
USPC .......................................... 411/386, 413, 415
See application file for complete search history.

(56) References Cited

U.S. PATENT DOCUMENTS

| | | | |
|---|---|---|---|
| 4,844,676 | A | 7/1989 | Adamek |
| 5,836,731 | A | 11/1998 | Goodwin et al. |
| 6,296,432 | B1 | 10/2001 | Kato |
| 6,561,741 | B2 | 5/2003 | Garver |
| 6,796,761 | B2 | 9/2004 | Mizuno |
| 7,334,975 | B2 | 2/2008 | Jungman et al. |
| 7,438,512 | B2 | 10/2008 | Jakuszeski et al. |
| 7,866,930 | B2 | 1/2011 | Murase |
| 8,197,170 | B2 | 6/2012 | Wagner |
| 2003/0059275 | A1 | 3/2003 | Mizuno et al. |

(Continued)

FOREIGN PATENT DOCUMENTS

| | | |
|---|---|---|
| EP | 1296070 A2 | 3/2003 |
| EP | 2163773 A2 | 3/2010 |
| JP | 2003-172330 | 6/2003 |

OTHER PUBLICATIONS

"Notification of Transmittal of the International Search Report and the Written Opinion of the International Searching Authority, or the Declaration," International Filing Date: Apr. 27, 2015, International Application No. PCT/US2015/027788, Applicant: Research Engineering & Manufacturing Inc., dated Jul. 29, 2015, pp. 1-10.

*Primary Examiner* — Flemming Saether
(74) *Attorney, Agent, or Firm* — Cesari and McKenna, LLP

(57) ABSTRACT

A threaded fastener system, incorporating a bolt and a nut assembly, wherein the bolt has a threaded lead entry point whose pitch and helix angle are of a higher magnitude than that of those on the body/shank of the bolt.

8 Claims, 4 Drawing Sheets

(56) References Cited

U.S. PATENT DOCUMENTS

2010/0068003 A1 3/2010 Wagner et al.
2014/0044499 A1 2/2014 Torii et al.

FASTENER SYSTEM COMPRISING AN EXTERNALLY THREADED BOLT AND AN INTERNALLY THREADED NUT FOR THE AVOIDANCE OF CROSS-THREADING OF THE MATING THREADS DURING ASSEMBLY

CROSS-REFERENCE TO RELATED APPLICATION

This application claims benefit of U.S. patent application Ser. No. 14/674,837, filed on Mar. 31, 2015, which claims priority to U.S. Provisional Application No. 61/987,138, filed on May 1, 2014, the contents of which are hereby incorporated by reference herein.

BACKGROUND OF THE INVENTION

In general and with reference to FIG. 1 it is recognized that an assembly that requires a bolt thread 1, of standard proportions, to be inserted into a pre-threaded nut 2, of standard proportions, can often result in a condition where the crest of the bolt thread 10, 10a makes initial contact with the root of the nut thread. The counter rotation of the nut and bolt threads may then cause the threads to jam into each other 3, 3a and will further restrict the action of the mating threads from achieving relative axial movement of the nut anchor and the bolt. As is well known to those skilled in the art, this action is termed "cross threading".

As will be appreciated by those skilled in the art, cross threading becomes more prevalent where the axes of the bolt thread 4 and the nut thread 5 are out of angular alignment at the initial point of assembly. It requires only a small misalignment of axes 4 and 5 to create this adverse assembly condition.

Many attempts have been introduced to bolt lead entry threads and/or nut entry threads, to overcome this adverse assembly condition. Exemplary anti-cross threading devices are described in U.S. Pat. No. 7,334,975, entitled FASTENER ASSEMBLY, by Jungman, et al, U.S. Pat. No. 7,438,512, entitled U-BOLT ASSEMBLY, by Jakuszeski, et al. and U.S. Pat. No. 5,836,731, entitled ANTI-CROSS THREADED FASTENER, by Goodwin et al, the contents of each are hereby incorporated by reference.

An example of the systems in current use can be viewed in relation to FIG. 2. Conventional systems rely upon changes to the bolt lead entry point geometrical configuration 14 that is aimed toward encouraging the lead threads of the bolt to slide over the nut thread root diameter and to assist in the mating threads creating thread pitch engagement and minimize cross threading. The above noted prior art recognizes that the circular (or radius) cross section of the lead entry threads 14 may not achieve this aim and anticipate that an additional plain dog point of circular cross section or of a special form that diminishes in magnitude as the section approaches the bolt entry end may be a requirement toward resisting nut and bolt threads from cross threading.

In each of these cases, the axial pitch 12 of the bolt lead entry threads are maintained at the same numerical value as the standard pitch of the bolt and nut threads. Without the extended point feature and with a small amount of misalignment between the nut and bolt axes, it remains a possibility for the initial assembly conditions as outlined and discussed in relation to FIG. 1 to be present and, due to the influence of the constant thread pitch 12, cross threading will still occur.

SUMMARY OF THE INVENTION

The present inventions relates to a fastener system aimed toward avoiding the cross-threading of a threaded bolt and a pre-tapped nut at the point of assembly and, in particular, to an innovative bolt lead entry point to achieve resistance to cross-threading at the point of assembly. More specifically, the present invention is directed to the development of a screw or bolt lead entry thread that is aimed toward inducing axial alignment of the nut and bolt threads, in an assembly, while eliminating the potential for the crest of the bolt thread 10 and 10a to have interference contact at the root diameter of the nut thread 11. Further, at initial assembly, the novel design of the lead entry point allows accelerated relative axial movement between the bolt thread 1 and the nut thread 2 and avoids the cross threading (jamming) of the nut and bolt threads.

BRIEF DESCRIPTION OF THE DRAWINGS

The organization and method of the invention together with further objects and advantages thereof can best be understood with reference to the following descriptions and accompanying drawings in which like reference numerals identify identical or functionally identical elements and in which.

DETAILED DESCRIPTION OF AN ILLUSTRATIVE EMBODIMENT

The present disclosure should be considered as an exemplification of the principles of illustrative embodiments of the present invention and that it is not intended to limit the invention to those embodiments illustrated and described herein. The system and principles may be susceptible to embodiments in differing forms from those that are described in detail.

Referring again to FIG. 1, there is shown a schematic illustration of a fastener system comprising a bolt in accordance with the present invention and a pre-threaded nut into which the bolt is to be assembled. It should be noted that while the description is written in terms of a bolt, any externally threaded fastener may be utilized in accordance with alternative embodiments of the present invention. It should further be noted that the description term 'nut' can be related to any internally threaded fastener that may be utilized in accordance with alternative embodiments of the present invention. As such, the description of a bolt and a nut as being utilized should be viewed as exemplary only.

The bolt and nut are being operatively assembled and whereby the bolt thread crest 10 contacts the nut thread root 11 and creates a potential thread interference, in these contact zones, where the bolt is rotated in a clockwise direction, relative to the nut, when viewed from the bolt head end of the assembly (denoted by arrow X) and due to the thread helix angles of the bolt and nut threads generated from the axial pitch 12 and major diameter 30 of the chosen thread, the bolt wants to move axially forward relative to the nut. However, due to the helix angles of both the nut thread and the bolt thread being of the same magnitude, the crest of the bolt thread maintains its initial contact position with the root of the nut thread and creates an increasing interference in the contact zones. This increasing interference will cause the relative bolt and nut threads to seize or otherwise jam.

Figure 2:
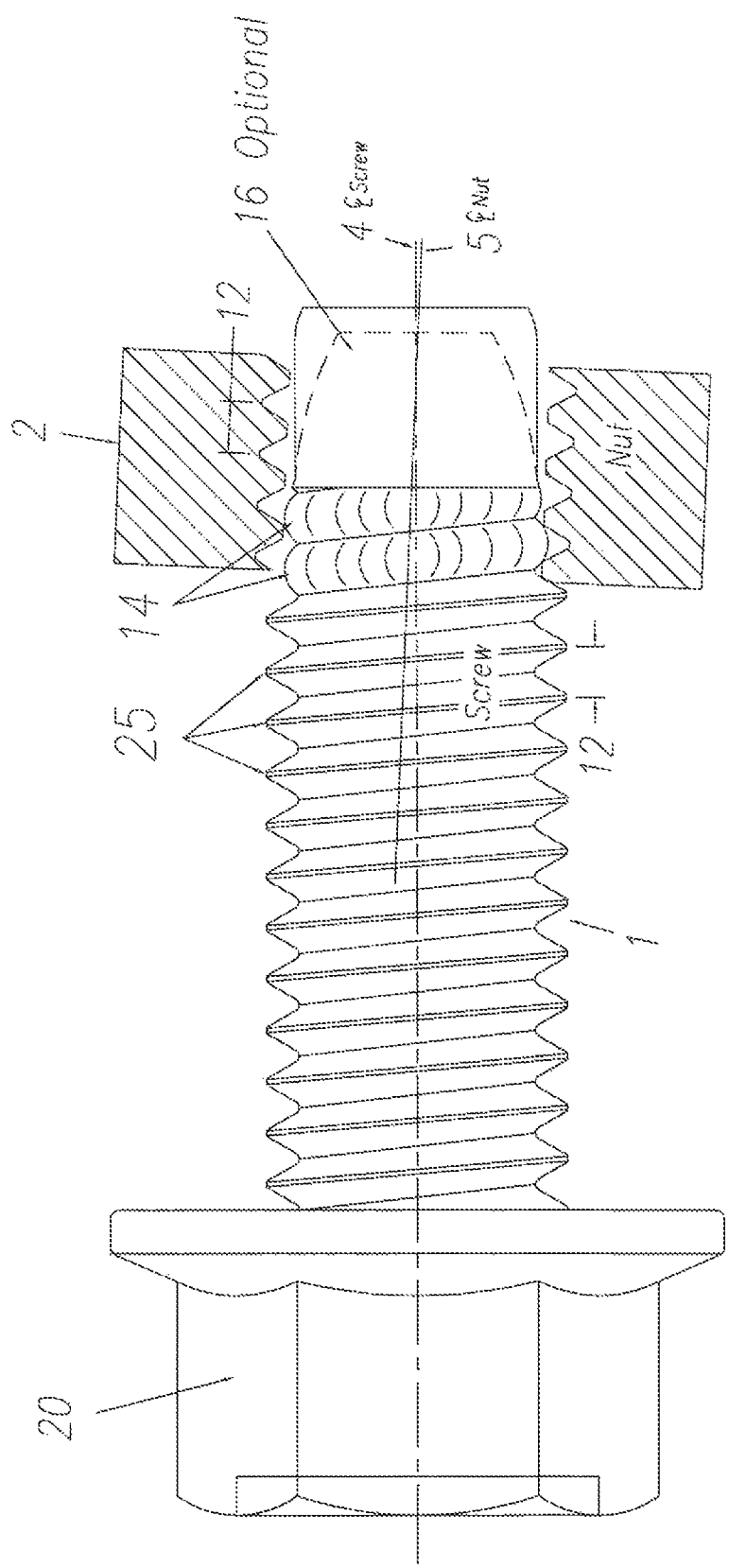
FIG. 2, previously described, is a schematic diagram illustrating a prior art method aimed toward overcoming cross threading.

Referring again to FIG. 2, there is illustrated a proprietary system that has been developed to overcome this initial adverse assembly condition. The system, as illustrated, relates to a number of different patents, described and previously incorporated by reference above. The system illustratively has a bolt thread entry point pitch 12 that is of the same magnitude as the nut and bolt pitches 12. However, a noted disadvantage of such a system is that should the initial thread contact be that of allowing the bolt thread crest 10 to contact the nut thread root 11, a similar adverse assembly condition, to that previously outlined, can develop, i.e., the bolt and the nut may become cross threaded.

Figure 3:
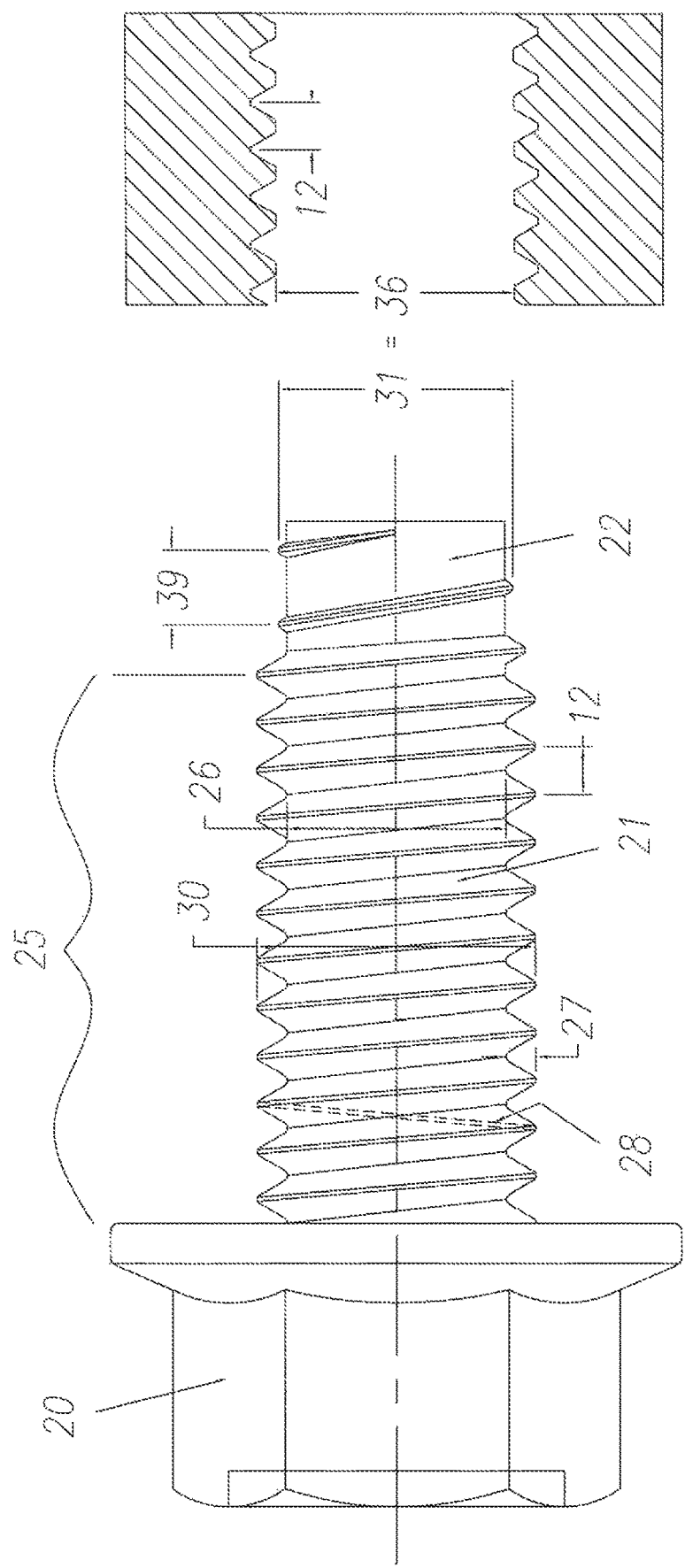
FIG. 3 is a schematic illustration of a bolt in accordance with an illustrative embodiment of the present invention.

Referring to FIG. 3 of the drawings there is shown a schematic illustration of the bolt in accordance with an illustrative embodiment of the present invention that comprises a head 20, a shank (or body) portion 21 and a lead entry point 22. The head 20 can be of any configuration that may be used for developing rotational movement to the bolt by means of a fastener drive system. The shank portion 21 may be round or may have a lobular cross sectional area as is known to those skilled in the art.

The shank 21 illustratively has a thread 25 formed thereon. The thread 25 is illustratively generated as a helical form around a core 26 in a manner that contains a thread height 27 as being of a constant magnitude for a specified size of bolt. The helical thread generated is illustratively in accordance with a known international/national standards specification or may be in accordance with a proprietary threaded fastener system that may deviate from international and/or national standards specifications. The thread on the shank 21 illustratively has an axial pitch 12 that develops the thread helix angle 28 in relationship to the axial pitch 12 and the bolt thread outside diameter 30. The bolt thread 25 may extend over the length of the bolt shank or may extend over only a portion thereof.

In accordance with an illustrative embodiment of the present invention, the bolt thread pitch 12 is the same as the pitch of the pre-threaded nut that has been chosen by the assembly fabricator.

The bolt lead entry threads are illustratively of an outside diameter 31 that nominally equates to the nut thread root diameter 36. The thread diameter 31 is nominally parallel in illustrative embodiments of the present invention. It is recognized that for practical purposes, the outside circumscribing circle of the lead threads 31 will be reduced below the inner diameter of the nut threads 36 such that the bolt lead entry threads 22 can enter the nut threads 2 without designed interference being present.

The lead entry point threads have a thread pitch 39 that equates to approximately 1.562 times the thread axial pitch 12 of the body threads of the bolt in accordance with an illustrative embodiment of the present invention. More generally, the lead entry point thread pitch 39 may be within the range of approximately 1.40 to 1.60 times the body thread axial pitch 12.

Figure 4:
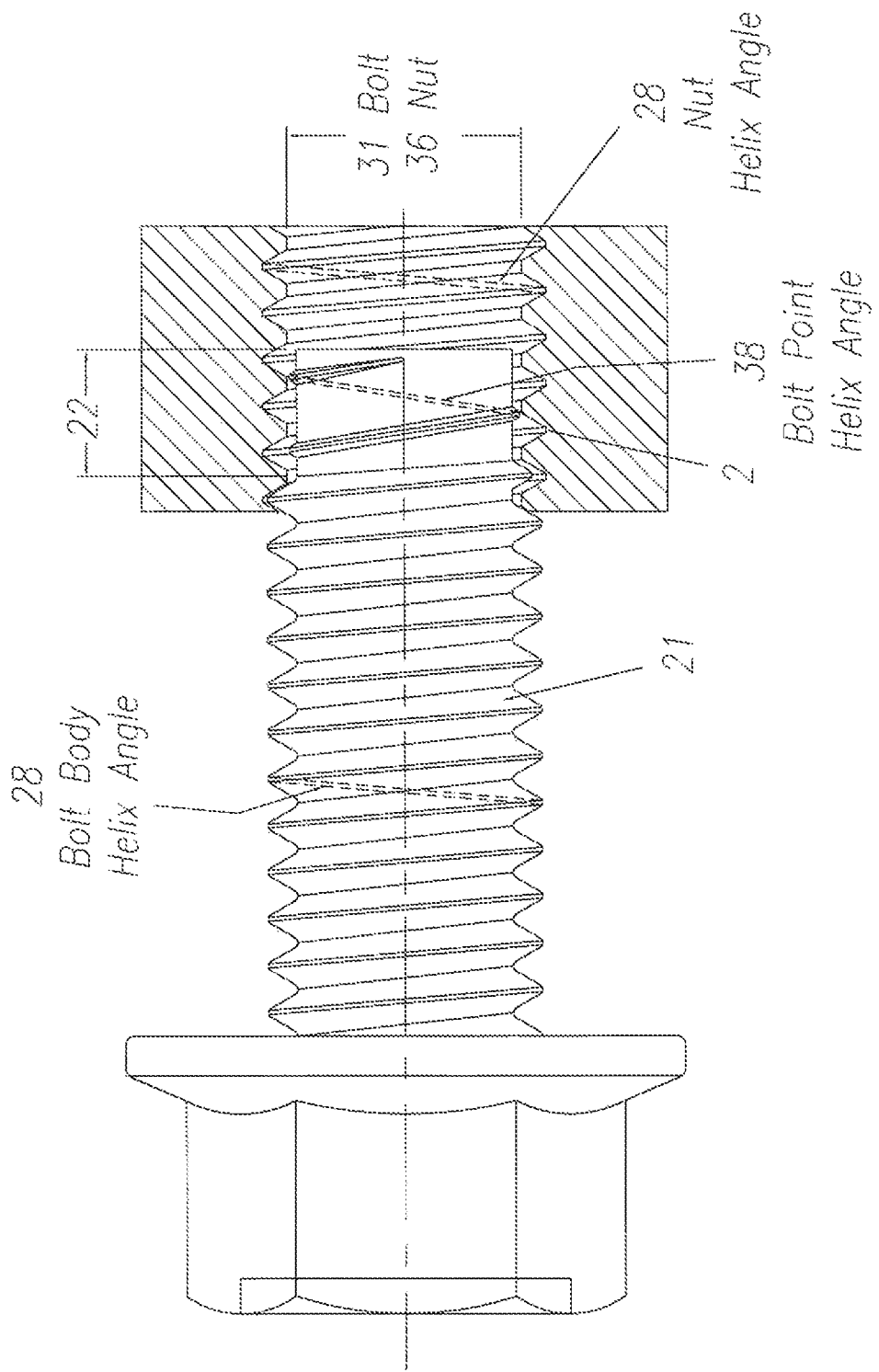
FIG. 4 an illustration of the effect that the variable pitch lead threads have in developing axial alignment of the nut and bolt threads in accordance with an illustrative embodiment of the present invention.

Referring to FIG. 4 it will be seen that the lead entry threads 22 of the bolt do not engage the thread profile 2 of the nut. They do make contact with the root diameter of the nut thread 36 and due to their higher pitch 39 and subsequent helix angle 38, when related to the nut helix angle 28, will accelerate the bolt axial movement relative to the nut thread than would be the case if all threads were of the same pitch.

When the accelerated forward movement takes place there is created axial alignment of the nut and bolt axes such that the main body threads 25 approach and contact the nut thread cavities 2 in a way that will eliminate the high potential for cross threading that has been encountered with previously designed (prior art) systems.

The geometrical construction of the bolt angle of the lead entry threads and the manner, in which the body threads and the lead entry threads are interrelated, work to ensure that the thread helix angle 38 of the lead entry threads is greater than the thread helix angle 28 of the body threads. As can be seen in FIG. 4, should the insertion of the bolt be at an angle that does not line up with the axis of the nut thread and should the crest of the lead angle threads contact the root of the nut thread, the higher helix angle of the bolt thread lead will accelerate the bolt threads forward at a rate that is faster than would normally be achieved should the helix angles match. This action will tend toward pulling the axes of the related threaded parts into alignment.

Figure 1:
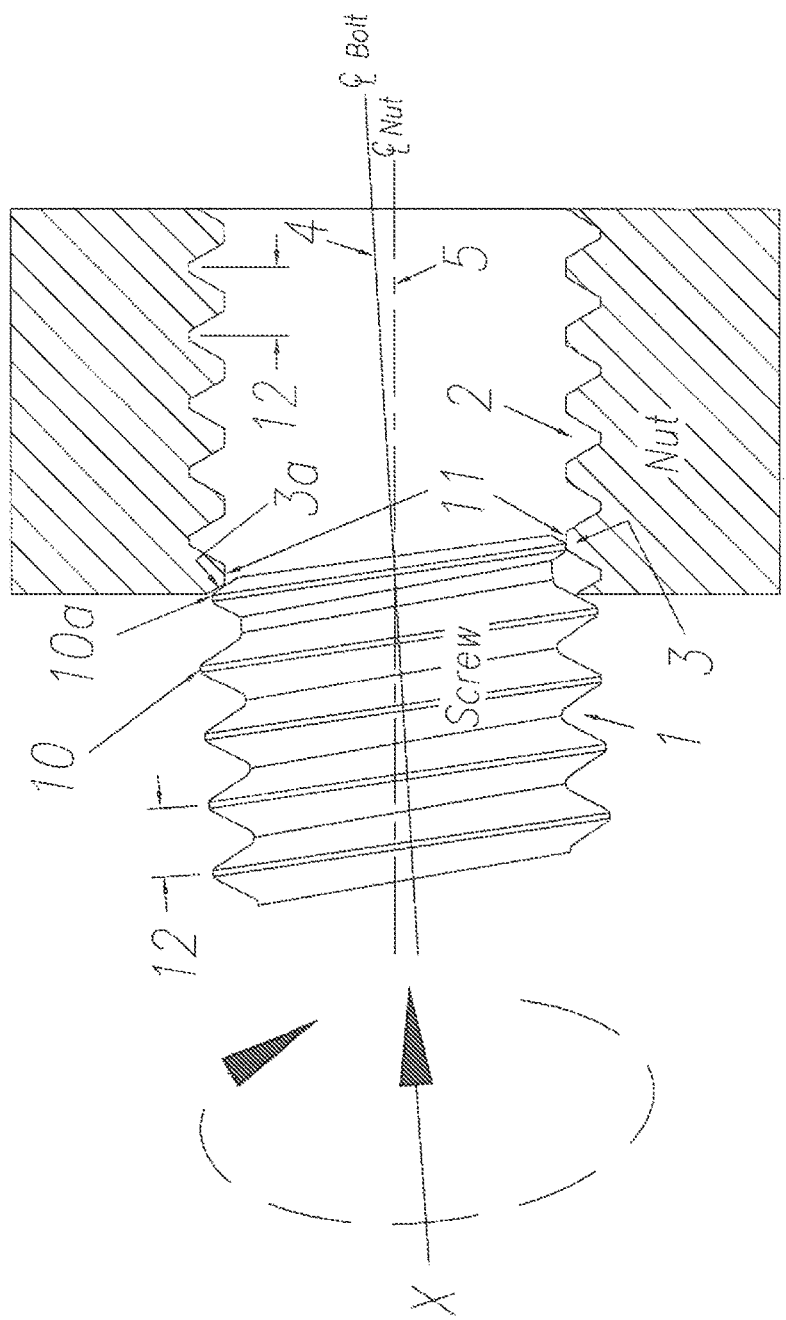
FIG. 1, previously described, is a schematic diagram illustrating the conditions that take place and can that lead to the adverse assembly condition of cross threading.

It can be further seen that the action of increasing the forward movement of the lead entry threads relative to the nut threads will eliminate the potential for the bolt thread crest to produce interference with the nut thread root and eliminate the potential for cross threading, in the manner prescribed in the references to FIG. 1.

The main body threads will, under these conditions, achieve initial mating thread contact in an acceptable and prescribed manner and will eliminate the cross threading that has been seen as cause for concern.

What is claimed is:

1. A system comprising:
    a shank of a bolt, having an external thread formed to engage a pre-threaded internal thread in a nut member, wherein the external thread of the shank and the internal thread of the nut member have a same thread pitch and a same thread helix angle;
    a lead entry point on the bolt, having a threaded entry point, wherein the threaded entry point has an entry point thread pitch higher in magnitude than the thread pitch of the shank and wherein the threaded entry point has an entry point helix angle higher in magnitude than the thread helix angle, of the shank of the bolt, wherein the entry point thread has a pitch that lies within the range of 1.4 to 1.6 times greater than the pitch of the bolt threads along the shank; and
    wherein an outside diameter of the lead entry point being approximately below a minor thread diameter of the nut member.

2. The system of claim 1 wherein the internal thread of the nut member is in accordance with any internationally known fastener standard.

3. The system of claim 1 wherein the internal thread of the nut member is in accordance with a proprietary fastener design.

4. The system in accordance with claim 1 wherein a thread root diameter of threads along the lead entry point is equal to or less than that of a thread root diameter of threads along the shank.

5. The system of claim 1 wherein the internal thread of the nut member is in accordance with any internationally known fastener standard.

6. The system of claim 1 wherein the internal thread of the nut member is in accordance with a proprietary fastener design.

7. The system of claim 1 wherein the entry point thread pitch equals approximately 1.562 times the thread pitch of the bolt threads along the shank.

8. The system in accordance with claim 1 wherein a thread root diameter of threads along the lead entry point is equal to or less than that of a thread root diameter of threads along the shank.

* * * * *